United States Patent [19]

Mitchell, Jr.

[11] 3,855,154

[45] Dec. 17, 1974

[54] CATALYST FOR CONVERSION OF NON-CYCLIC $C_3$-$C_5$ ALKANES TO AROMATIC HYDROCARBONS

[75] Inventor: Maurice M. Mitchell, Jr., Wallingford, Pa.

[73] Assignee: Atlantic Richfield Company, New York, N.Y.

[22] Filed: Jan. 18, 1973

[21] Appl. No.: 324,720

[52] U.S. Cl................. 252/456, 252/458, 252/464, 252/465, 260/673
[51] Int. Cl........................... B01j 11/06, B01j 11/32
[58] Field of Search .......... 252/456, 465, 458, 464; 260/673

[56] References Cited
UNITED STATES PATENTS

| 3,480,684 | 11/1969 | Hansford | 252/465 X |
| 3,644,550 | 2/1972 | Beuther et al. | 260/673 |
| 3,678,139 | 7/1972 | McClellan et al. | 252/456 X |
| 3,761,536 | 9/1973 | Bozik et al. | 260/673 X |

Primary Examiner—C. Dees
Attorney, Agent, or Firm—Delbert E. McCaslin

[57] ABSTRACT

Method for the conversion of non-cyclic $C_3$ - $C_5$ alkanes to aromatic hydrocarbons in a single stage employing particles of bismuth oxide on an inert support physically admixed with particles of a chromia-alumina catalyst having low coking and burning characteristics, the physical mixture being particularly characterized by the method of producing the supported bismuth oxide and by the fact that the chromia-alumina constitutes the major portion of the mixture.

4 Claims, No Drawings

CATALYST FOR CONVERSION OF NON-CYCLIC C₃-C₅ ALKANES TO AROMATIC HYDROCARBONS

BACKGROUND OF THE INVENTION

This invention relates to a method for the conversion of non-cyclic $C_3 - C_5$ alkanes to specific aromatic hydrocarbons in a single stage at high yields and selectivities employing particles of supported bismuth oxide physically admixed with particles of chromia-alumina catalyst characterized by having low coking and burning properties. The physical admixture is also characterized by the specific method of making the supported bismuth oxide and the fact that the chromia-alumina is the major component of the mixture. The $C_3 - C_5$ alkanes are also characterized by being capable of being dehydrogenated to an olefin having an allylic hydrogen atom, in particular propane and isobutane.

It is well-known to dehydrogenate alkanes to olefins, and the prior art is replete with methods for this conversion. It is also well-known that acyclic olefins of 3 to 4 carbon atoms, for example, can be dehydrodimerized with a compound containing oxygen bonded to bismuth and active for the removal of a hydrogen atom from the terminal methyl group of such olefins, for example, U.S. Pat. No. 3,631,216 shows sodium bismuthate and bismuth oxide as dehydrodimerization agents for $C_3$ and $C_4$ olefins. The products resulting from such dehydrodimerization reactions are predominantly the corresponding diolefin and it has also been proposed to cyclicize and dehydrogenate such diolefins to produce the corresponding aromatics.

Thus, although alkanes could be converted to aromatics by a series of steps, it was shown in a recently issued patent, U.S. Pat. No. 3,644,550 (1972), that a mixture of particles of bismuth oxide and chromia-alumina could be used to accomplish the conversion of isobutane, or a mixture of isobutane and isobutylene, to para-xylene. In this patented process, however, the weight ratio of bismuth oxide particles to chromia-alumina particles had to be in the range of from 19:1 to about 1:1 with examples showing a ratio of bismuth oxide to chromia-alumina of 4:1 weight ratio. In addition the process required long contact times with the result that a large quantity of catalyst was required per pass of hydrocarbon feed. The patentees demonstrated however, that the conversion could be accomplished in a single stage to give a good selectivity of para-xylene of high purity and thus accomplished a useful result. There are, however, certain inherent disadvantages in the patented process, namely, because of the long contact time required there would be a prohibitive amount of uncontrollable coking and burning of the charge and with the high amount of bismuth oxide required, which compound is relatively scarce, the process could not compete economically with existing commercial processes for the production of para-xylene. In addition the patented process shows the production of appreciable amounts, 5 per cent or more, of 2,5-dimethyl-2,4-hexadiene which is unconverted to aromatics and thus presents a problem of separation from the para-xylene because of the closeness of the boiling points of the two compounds.

SUMMARY OF THE INVENTION

In accordance with the instant invention a $C_3$ to $C_5$ non-cyclic alkane which can be dehydrogenated to an olefin having an allylic hydrogen atom such as propane, n-butane, isobutane, 2-methylbutane and the like is contacted with a dehydrodimerization compound containing oxygen bonded to bismuth and active for the removal of a hydrogen from the terminal methyl group of the olefin corresponding to the dehydrogenated aforementioned alkanes with particles of a chromia-alumina catalyst which has been treated such that it has low coking and burning properties. The dehydrodimerization compound such as bismuth oxide, $Bi_2O_3$, is supported on an inert support such as silica, such that the particles will have approximately the same density as the chromia-alumina particles and in addition the particles of each material are in the same particle size range. The conversion is carried out in the range of from 575° C. to 650° C. at about atmospheric pressure or slightly above. The proucts are principally benzene, ortho-xylene, para-xylene and para-diethylbenzene, respectively, from the above-named alkanes.

An additional feature of the invention is that a specific method of producing the dehydrodimerization agent is required in order that it has the desired density to match that of the chromia-alumina and that it has an activity such that a short contact time is employed and with a weight of chromia-alumina being in considerable excess over the weight of the bismuth oxide. In addition since the bismuth oxide enters into the reaction with loss of oxygen such loss must be terminated at a specific point and the compound reactivated in a specific manner.

It is an object of this invention therefore to provide a method for the single stage conversion of non-cyclic $C_3 - C_5$ alkanes to aromatic hydrocarbons having twice the number of carbon atoms as the starting $C_3 - C_5$ alkane.

It is another object of this invention to provide a mixture of particles in a specific size range of bismuth oxide on a support with particles in the same size range of chromia-alumina catalyst in a weight ratio that will convert $C_3 - C_5$ alkanes to the corresponding aromatic hydrocarbons having twice the number of carbon atoms as the specific starting alkane at short contact times with high conversion and selectivities.

It is another object of this invention to provide a method for the production of a supported bismuth oxide dehydrodimerization agent in particle form in a specific size range and having an activity such that said particles can be combined with particles of a chromia-alumina catalyst to convert $C_3 - C_5$ alkanes to their corresponding aromatics having twice the number of carbon atoms as the starting alkane.

Additional objects of this invention will be apparent from the description of the invention which follows and from the claims.

DESCRIPTION OF THE INVENTION

The $C_3 - C_5$ alkanes which can be used in the instant invention are those which can be dehydrogenated to an olefin having an allylic hydrogen atom, in particular propane for the production of benzene and isobutane for the production of para-xylene. In addition, however, n-butane can be used for the production of ortho-xylene and 2-methylbutane can be used in the production of para-diethylbenzene. Although n-pentane can be used to produce principally 1,2,4,5-tetramethyl benzene (durene) the yields and selectivities are less attractive because of competing side reactions. Neopentane (2,2-dimethylpropane) cannot be employed in the instant invention since it cannot be dehydrogenated to a $C_5$ olefin having an allylic hydrogen or in fact be converted to a $C_5$ olefin of any kind and, thus it cannot be converted to a $C_{10}$ aromatic.

The dehydrodimerization agent, i.e. bismuth oxide must be produced in a specific manner in order to provide the particle size and activity required for the method of this invention. Although the bismuth oxide can be deposited on a variety of inert supports or slightly basic support materials such as magnesia, zirconia, and the like, the preferred support is silica gel. The most preferred method of producing the supported bismuth oxide is by the oxy nitrate method. Reagent grade bismuth nitrate is dissolved in dilute nitric acid, i.e., from 3 to 15 volumes of reagent grade concentrated nitric acid is combined with sufficient water to make 100 volumes of dilute acid, with 6 to 8 volumes concentrated nitric acid combined with sufficient water to make 100 volumes being a convenient dilute solution. The exact dilution is not critical and the aforementioned dilutions are preferred primarily for their convenience in the preparation. Concentrated solutions of nitric acid, however, should be avoided. A convenient weight proportion of the bismuth nitrate in the nitric acid solution is 2 parts by weight of the bismuth nitrate to one part by weight of the nitric acid solution although this is not critical and can be varied from the solubility limit of the bismuth nitrate in the nitric acid solution to 1 part by weight of the bismuth nitrate to 10 parts by weight of the nitric acid solution. Extremes, however, in either direction simply are less convenient since on the one hand the bismuth nitrate solution is so concentrated it cannot be deposited evenly on the silica gel while on the other hand if very dilute too much solution must be handled. The bismuth nitrate in nitric acid solution is then contacted with silica gel of from 20 to 50 mesh, i.e., particles which pass through the 20 mesh screen and are retained on the 50 mesh screen of a U.S. Sieve.

The silica gel can be any one of a number of commercial grades which are prepared in a manner such that they retain their pore structure and do not decrepitate (fracture into pieces) in aqueous solutions such that the particles can be impregnated with any desired salt contained in the aqueous solution. In general such commercial materials have surface areas of the order of 300 square meters per gram as measured by conventional techniques.

The silica gel slurry in the bismuth nitrate solution is evaporated with constant stirring to deposit the bismuth nitrate on the silica surface. The solids thus obtained are air dried and quenched with sufficient dilute aqueous ammonia for example 1 volume concentrated aqueous ammonium hydroxide and 99 volumes of water, such that the final pH of the wash solution is of the order of about 10. Dilute ammonia is used to neutralize the nitric acid to prevent excessive heat of neutralization which would disintegrate the solid particles. The solids are recovered by filtration and dried at an elevated temperature, for example, of from about 100° C. to 130° C., relatively slowly such as for about 5 hours. Although somewhat shorter times or longer times can be used, so-called "flash-drying" is to be avoided. It is desired to obtain the free-flowing solids without disintegrating the solid particles.

The method of calcination of the dried solids thus obtained is a critical feature of the invention. It is preferred the calcination be in air and it is necessary in calcining that the calcination temperature be increased slowly so that the final calcination temperature is reached only after about 6 to 8 hours or longer. In general the final calcination temperature should be in the range of from about 575° C. to 625° C. with the preferred range being from 600° C. to 610° C. The solids are held at this temperature for an additional hour. One method of accomplishing this method of calcination is to calcine in temperature stages holding the solids at a particular temperature stage for from ½ to 1 hour with the increments between stages being from 35° C. to 50° C. preferably. For example, a quantity of solids produced as described above were calcined at 149° C., 187° C., 225° C., 263° C., etc., up to 605° C., i.e., 38° C. increments throughout, with the time at each stage being about ½ hour and with the solids being held at 605° C. for 1 hour. Thus, it required approximately 6 hours to raise the catalyst to the final calcination temperature and it was held at this temperature for the additional hour. If calcination is carried out in stages in this manner, which is convenient in small scale or small plant scale procedures, the time should be at least ½ hour at each stage and preferably if the temperature increments are toward the larger end of the range then longer times should be used, for example up to 1 hour. Increments of temperature larger than about 50° C. are to be avoided since these tend to cause disintegration of the solid particles. On a commercial scale where close temperature control and moving gas streams such as air, preferably, can be employed to aid the decomposition of the nitrate it is unnecessary to use stage calcination since the temperature can be raised gradually over the desired 6 to 7 hour period and held at the desired upper calcination temperature for the required time. After cooling the solids are ready for use.

It has been found that the amount of bismuth oxide on the silica gel should be in the range of from about 12 weight per cent to about 22 weight per cent and preferably from about 14 to 16 weight per cent based on the total weight of the agent. In order to obtain this amount of "loading" on the silica gel it is necessary to adjust the ratio of bismuth nitrate in the nitric acid solution to the amount of silica gel to provide these proper proportions. It has been found that when the bismuth oxide is deposited on the silica gel in the manner described that the surface area of the resulting composition is in the range of from 200 to 250 square meters per gram showing only a nominal loss from the original surface area of the silica gel.

Thus the critical features of the dehydrodimerization agent preparation are that the particle size be in the range of from 20 to 50 mesh U.S. Sieve, that the loading of the bismuth oxide on the silica gel be within the range described in order to provide (1) the desired activity and surface area and, (2) a particle having essentially the same density as the chromia-alumina particles to be described hereinafter. In addition to having the desired loading of bismuth oxide on silica gel particles in the 20 to 50 mesh range, after depositing the bismuth nitrate on the silica gel from the nitric acid solution, the air dried particles are washed with a sufficient amount of dilute aqueous ammonia to give a final pH of the wash solution in the range of about 10 and thereafter the particles are dried slowly to give a free-flowing material. It is then critical that these solids be calcined, in air, at the slow rate described in order to develop the maximum activity of the bismuth oxide as it is produced by the decomposition of the nitrate and so that the final calcined composition retains a large proportion of its original surface area and at the same time does not disintegrate the particles, which decomposition occurs with too rapid calcining.

As will be shown in detail hereinafter the amount of bismuth oxide on the silica gel should be within the desired range since if amounts lower than about 12 per cent are employed the composition is not sufficiently active and would require inordinately large amounts of the material, contrary to the objects of the invention, while if too large amounts of bismuth oxide are deposited on the silica gel the density is higher than the density of the chromia-alumina particles, the activity of the agent is too high and too much bismuth oxide is required thus again defeating the objects of the invention.

The chromia-alumina catalyst for use in this invention can be any chromia-alumina catalyst, but preferably is the commercial material produced by conventional manufacturing methods and having conventional composition. In general, chromia-alumina catalysts can be prepared by treating preformed alumina particles with a solution of a chromia compound and, thereafter, the impregnated particles are pelleted, dried and calcined to produce the desired chromia-alumina catalyst. Although chromia-alumina compositions containing from about 10 to about 25 mole per cent chromia can be used, the preferred chromia-alumina catalysts are those containing from about 17 to 18 mole per cent chromia since such catalyst has the optimum density and activity. Irrespective of the method of manufacture or source of the chromia-alumina such catalysts generally contain acid sites.

Acid sites are well-known to catalyze coking and cracking of hydrocarbons and in the instant invention they also promote burning reactions. It has been found that if the chromia-alumina catalyst is treated with a dilute, e.g., 1 weight per cent, aqueous solution of a base, sodium hydroxide, preferably, for a number of hours, for example, about 16 hours such that the catalyst is completely penetrated by the hydroxide, the acid sites are substantially completely neutralized. The catalyst is washed thereafter until the wash water has a pH of 7 showing that neutrality has been achieved and any excess hydroxide has been removed. If, however, the chromia-alumina catalyst is not in the 20 to 50 mesh range, U.S. Sieve, it is crushed and sieved to produce a fraction in this range and thereafter is neutralized as described.

It has been found, as has been pointed out, that when the silica gel is loaded with 14 to 16 weight per cent bismuth oxide the density of these particles are substantially the same as the density of the chromia-alumina particles and, since they have the same particle size range they can be admixed in any desired proportion without danger of segregation, i.e., there is produced a non-segregating admixture. This permits mixing the particles in a fixed bed operation or in a moving bed system.

In a fixed bed process the single reactor containing the mixed solids can be operated either up-flow or down-flow.

The solids can be in the form of a single bed or can be supported on trays or similar conventional means. In the moving bed system the solids are passed through a reactor zone and then into a regeneration zone for regeneration with air.

The bismuth oxide dehydrodimerization agent reacts with the allylic hydrogen on each of two molecules of the olefin produced from the dehydrogenation of the alkane. The dehydrodimerization reaction thereby produces water and a di-allylic dimer of the olefin, for example, if isobutane is utilized as the alkane isobutylene is produced which in turn is converted to the 2,5-dimethylhexadiene-1,5 and the bismuth oxide will be reduced while water is also produced. In operation the oxygen is extracted from the crystal lattice of the bismuth oxide supported on the silica gel support and if more than from about 50 to 70 per cent of the oxygen is removed there is danger that the crystal lattice may collapse.

It is preferred to discontinue the reaction, however, when from about 20 to 50 per cent of the oxygen has been removed from the bismuth oxide. After the reaction is stopped the mixture of supported bismuth oxide and chromia-alumina is purged with an inert gas such as steam, carbon dioxide or nitrogen preferably while in the reactor and then the mixture is regenerated with a dilute molecular oxygen-containing gas such as air at temperatures preferably between 600° C. and 650° C. The regeneration accomplishes two objectives, it replaces the oxygen lost from the bismuth oxide and also burns off any coke or hydrocaarbonaceous deposits on the chromia-alumina catalyst. It is preferred to discontinue the regeneration before all of the oxygen has been replaced in the bismuth oxide, i.e., the oxide content has been replaced to the extent of from about 95 to 98 per cent of that originally present. It has been found that if it is attempted to replace all of the oxygen content of the bismuth oxide, it becomes "over-activated" and promotes burning instead of the desired reactions.

After regeneration the mixture is again purged and the hydrocarbon reactant is again passed over in contact with the mixutre.

As has been pointed out the particle size range of the two components must be in the range of from 20 to 50 mesh, U.S. Sieve, in order to achieve the objects of this invention namely that the two components have the desired activity to give the optimum selectivity for the production of the desired aromatic and in addition have the same density such that the mixture is non-segregating. It is theorized also that if the particle size is larger than about 20 mesh, the particles of the supported bismuth oxide dehydrodimerization agent and the particles of the chromia-alumina catalyst are so far apart that when the dehydrogenation reaction occurs before the dehydrodimerization reaction, or alternatively, after the dehydrodimerization reaction there is sufficient time for side reactions to occur before the aromatization reaction. Thus the particles should not be larger than the 20 mesh in order to minimize the time for the reaction molecules to move from one active particle to the other.

In support of this hypothesis it has been found that with particles larger than about 20 mesh the selectivity for the production of para-xylene from isobutane, for example, decreases very markedly, that is the particles are too far apart to give the desired selectivity for the production of the stable aromatic and instead other reactions have time to occur.

Likewise if the particles are smaller than about 50 mesh they are so close together that apparently some "sintering" or similar phenomenon occurs with the result the mixture loses its selectivity for the production of the aromatic and instead forms a complex which promotes "burning," i.e., $CO_2$ production, instead of promoting the desired reactions.

The additional critical feature of this invention is that the weight ratio of the chromia-alumina to the bismuth oxide itself, i.e., not including the weight of the support should be greater than 1:1. It has also been found preferable to use about a 1:1 weight ratio of chromia-alumina to supported bismuth oxide. It has also been found that chromia-alumina particles having from 10 to 25 weight per cent chromia ($Cr_2O_3$) and bismuth oxide on silica gel having from 12 to 22 weight per cent bismuth oxide ($Bi_2O_3$) are sufficiently near the same density so that in the same particle size range these two components do not segregate to the extent to render the process inoperable. The commercial chromia-alumina catalyst contains about 17.5 weight per cent $Cr_2O_3$ and its density matches almost exactly the density of bismuth oxide-silica gel composition wherein the bismuth oxide amounts to from 14 to 16 weight per cent. Thus in general it can be stated that with the desired weight ratio of supported bismuth oxide to chromia-alumina of about 1:1 the chromia-alumina weight ratio to the bismuth oxide alone (i.e., it can range from 12 to 22 weight per cent of the supported composition) will be in the range of from 8.4:1 to 4.6:1 and at the preferred range of 14 – 16 weight per cent bismuth oxide on silica gel the ratio is about 7.2:1 to 6.2:1. The most preferred ratio of chromia-alumina to silica gel supported bismuth oxide (14.5 $Bi_2O_3$) is about 7:1.

The reaction can be carried out in the range of from 575° C. to 650° C. with a somewhat more preferred range being 600° C. to 625° C. A specific temperature of about 610° C. has been found to be particularly satisfactory.

The reaction can be carried out either at subatmospheric, atmospheric or super-atmospheric pressures, however, slightly superatmospheric pressures are preferred, i.e., in the range of 50 psia to 100 psia, with 100 psia being a convenient pressure.

The fresh feed is preferably the pure alkane since it is desired to produce the pure aromatic as has been described, however, since one of the by-products of the reaction is the mono-olefin corresponding to the alkane this can be recycled to the reaction together with the fresh feed. Thus, for example, if isobutane is tha alkane feed some isobutylene will be produced which is not converted to the aromatic and this can be recycled to the reactor along with the fresh feed isobutane.

The contact time can range from 0.1 seconds to 3.0 seconds with from 0.3 to 2.6 seconds being preferred and from 0.5 to 2.0 being more preferred, with a time of about 1.3 seconds being used for comparative purposes in many of the runs shown in the examples which follow. These times are at reaction conditions, i.e., taking into account reaction temperature and void space in the reactor. When this is converted to space time units as described in the prior art (wherein a mixture of bismuth oxide and chromia alumina is employed) it is less than 4 seconds, i.e., less than the minimum and far less than the most preferred range.

As has been pointed out the instant invention uses a supported bismuth oxide-chromia-alumina mixture wherein the weight of the chromia-alumina is greatly in excess of the bismuth oxide. Consequently, taking this into account along with the shorter contact time required in the instant method it can be shown that for commercial plants of the same capacity the plant using the supported bismuth oxide and chromia oxide in the desired weight ratio and particle size range with the density of the particles being substantially the same the amount of bismuth oxide required is less than about 1 per cent of that required in the plant using the method of the prior art wherein bulk bismuth oxide is the major component and the particle size of the components are larger, i.e., the smallest prior art particles are retained on a 20 mesh sieve whereas the largest particles of the components of the instant invention pass through the 20 mesh sieve.

In the following examples the bismuth oxide supported on silica gel was produced by the oxy nitrate method described in detail hereinbefore. The bismuth nitrate solution was admixed with the dilute nitric acid as described and then deposited on commercial 20–50 mesh U.S. Sieve silica gel having a surface area of about 300 square meters per gram. After drying, quenching with aqueous ammonia until the final solution had a pH of 10 the solids were recovered and dried at about 130° C. for 5 hours. The solids were calcined in stages at 149° C., 187° C., 225° C., etc. up to 605° C. (38° C. increments throughout) with the time at each stage being about one-half hour. The 605° C. temperature was held for one hour. In a typical product the bismuth oxide-silica supported material had a surface area of 223 square meters per gram showing only a nominal reduction of the original surface area. In each production run the amount of bismuth oxide to silica gel was adjusted to give the desired "loading" of the bismuth oxide on the silica gel support. The solids after cooling were admixed with the chromia-alumina catalyst.

The chromia-alumina catalyst employed in the runs of the examples which follow was a commercial material which had been reduced in particle size and sieved to give a 20 – 50 mesh U.S. Sieve fraction. The catalyst contained 17.5 weight per cent chromia ($Cr_2O_3$). Since the catalyst as received always contained acidic sites it was treated to neutralize those sites. This treatment consisted of contacting the catalyst with a 1 weight per cent sodium hydroxide solution, washing until essentially neutral wash was obtained and drying. The base may also be potassium or ammonium hydroxide, for example, since this is not critical nor is the exact concentration critical, however, dilute solutions are preferred in order that washing is facilitated. The neutralization step is a critical step in the chromia-alumina catalyst preparation, i.e., in addition to the sizing and sieving to the desired mesh range, since the unneutralized chromia-alumina has been found to effect markedly the selectivity of the process in particular the purity of the desired aromatic and also increases the burning tendencies of the catalyst.

In the runs which follow a tubular electrically heated reactor was employed. In general 25 cc of the silica gel supported bismuth oxide-chromia-alumina catalyst particle mixture was employed. The particles were maintained at the desired reaction temperature and the hydrocarbon flow over the particles was maintained for about 4 minutes using a flow rate to provide the desired residence (contact) time. In this length of time approximately 15 – 20 per cent of the oxygen in the bismuth oxide was consumed. The reactor was flushed with an inert gas (argon, although any inert gas could be employed commercially) regenerated with air, flushed again with inert gas (argon) and then the flow of hydrocarbon was resumed. As has been pointed out the regeneration of the bismuth oxide was halted shortly before completion to preserve its selectivity and prevent over-activation.

The following examples are provided to illustrate the invention further and are not to be construed as limiting.

EXAMPLE I

In order to demonstrate the effect of particle size, a number of runs were carried out using various mesh size particles. It is, of course, obvious that one cannot simply coat large particles and reduce them to the finer mesh sizes since the coating is on the outside of the particles and grinding would simply expose uncoated surfaces. Moreover, if various size particles were coated the surface to weight of bismuth oxide ratio would not be comparable for the various mesh size ranges consequently bulk bismuth oxide particles were prepared by slurrying bismuth oxide powder in a nitric acid solution prepared by mixing 25 volumes reagent grade concentrated nitric acid with 75 volumes of water. After filtering, drying and calcining the filter cake was crushed into granules of the desired mesh size ranges shown in Table I. One volume of bismuth oxide granules was mixed with 2 volumes of neutralized chromia-alumina catalyst. In the first run the bismuth oxide granules were 10 to 12 mesh U.S. Sieve while the chromia-alumina was 12 to 20 mesh. This prevented to some degree segregation of the particles. In the other runs the particles were in the same mesh range. The runs were made on isobutane at 610° C. and contact times were varied to give constant conversion for strict comparison purposes. The results are shown in Table I.

TABLE I

| Particle Size Range, U.S. Sieve | 10–12*<br>12–20** | 20–50 | 50–100 | 100–200 |
|---|---|---|---|---|
| Conversion of Isobutane, wt. % | 20 | 20 | 20 | 20 |
| Para-xylene selectivity wt. % based on isobutane converted | 18 | 42.5 | 34.5 | 7 |
| CO₂ Selectivity based on isobutane converted | 6 | 14.0 | 44.5 | 82.5 |

*Bismuth oxide
**Chromia-alumina

It will be apparent that the 20 – 50 mesh particles size range gives the optimum selectivity for para-xylene production and also minimizes the burning reaction since the ratio of $CO_2$ selectivity to para-xylene selectivity is the same for the 20 – 50 mesh particles as for the 10 to 20 mesh particles but the para-xylene selectivity is greatly increased for the 20 to 50 mesh range.

Having demonstrated the criticality of particle size it was next necessary to show the criticality of the amount of bismuth oxide on the support and the need for a high ratio of chromia-alumina to the bismuth oxide. This is shown in Example II.

EXAMPLE II

In order to show the above described effects of varying the amount of bismuth oxide on the silica gel support, various supported bismuth oxide agents were produced in the 20 – 50 mesh U.S. Sieve range in accordance with the procedure described herein. These particles were admixed with an equal volume of the neutralized chromia-alumina particles in the same 20 – 50 mesh range. The reaction was carried out with isobutane at 600° C. with a contact time of 1.3 seconds. The conditions and results are shown in Table II.

TABLE II

| Wt. % $Bi_2O_3$ on silica gel support | 5 | 10 | 14.5 | 20 | 40 |
|---|---|---|---|---|---|
| Conversion of isobutane, wt. % | 28 | 26 | 30 | 36 | 28 |
| Para-xylene selectivity wt. % based on isobutane converted | 10 | 11 | 13 | 10 | 14 |
| Para-xylene yield % | 2.8 | 2.9 | 3.9 | 3.6 | 3.9 |
| Para-xylene purity % | 86.6 | 85.6 | 99+ | 99+ | 99+ |
| $CO_2$ selectivity wt. % based on isobutane converted | 15.9 | 9.2 | 3.6 | 5.2 | 6.6 |

It will be seen from these data that a "loading" of from about 12 to 22 weight per cent $Bi_2O_3$ on the silica gel produces optimum selectivity, yields and purity of para-xylene while minimizing $Co_2$ production. It is also apparent from these data that a preferred range is from 14 to 16 weight per cent $Bi_2O_3$ on the silica.

A number of other runs were carried out on other hydrocarbons and mixtures thereof such as propane, n-butane, propane and isobutane, isobutane and isobutylene to demonstrate that the desired aromatics could be produced. The isobutane-isobutylene mixture simulated recycle of xylene-free product, for example.

The critical features of this invention, however, have been demonstrated namely that there is a critical particle size range for the two components that the bismuth oxide must be supported and prepared in a critical manner in order to provide the desired selectivity and density characteristics such that the two components are non-segregating and that the chromia-alumina component must be in excess over the bismuth oxide in order to provide the advantages over prior art processes.

I claim:

1. A method for the production of supported bismuth oxide dehydrodimerization particles of from 20 to 50 mesh size and having substantially the same density as particles of a chromia-alumina catalyst containing from 10 to 25 mole per cent chromia in the same size range for use in a non-segregating admixture with said chromia-alumina particles at a weight ratio of supported bismuth oxide to chromia-alumina of about 1:1 for the conversion of non-cyclic $C_3$–$C_5$ alkanes to aromatic hydrocarbons of twice the number of carbon atoms as the alkane converted, which comprises dissolving bismuth nitrate in dilute nitric acid, contacting the resulting solution with silica gel particles in the 20 to 50 mesh range, U.S. Sieve, to deposit the bismuth nitrate on the silica gel surface, the ratio of bismuth nitrate to silica gel being adjusted such that after the bismuth nitrate is converted to the bismuth oxide, the bismuth oxide on the silica gel will range from about 12 weight per cent to 22 weight per cent based on the combined weight of the bismuth oxide and silica gel, drying the coated particles, contacting the coated particles with a dilute solution of ammonium hydroxide until the final pH of the wash solution is about 10, recovering the solids by filtration, drying the recovered solids at from about 100°C. to 150°C. calcining the dried solids by gradually increasing the calcination temperature over a period of about 6 to 8 hours to a final temperature in the range of 575°C. to 625°C. and finishing the calcination by holding the particles at the final calcination temperature for about 1 hour.

2. A method for producing a chromia-alumina catalyst for use in combination with particles of supported bismuth oxide dehydrodimerization agent of from 20 to 50 mesh size at a weight ratio of supported bismuth oxide to chromia-alumina of about 1:1 for use in the conversion of non-cyclic $C_3$–$C_5$ alkanes to aromatic hydrocarbons of twice the number of carbon atoms as the alkane converted which comprises contacting a chromia-alumina catalyst containing from 10 to 25 mole per cent chromia having a particle size in the range of from 20 to 50 mesh, U.S. Sieve, with a dilute aqueous solution of a base selected from the group consisting of sodium hydroxide, potassium hydroxide and ammonium hydroxide for a time sufficient to substantially completely neutralize the acidic sites on said catalyst, washing the neutralized catalyst with water until the wash water has a pH of about 7 and drying the washed catalyst.

3. The method according to claim 1, wherein the ratio of bismuth nitrate to silica gel is adjusted such that the bismuth oxide ranges from 14 to 16 weight per cent of the combined oxide and silica gel.

4. A supported bismuth oxide dehydrodimerization agent and chromia-alumina catalyst non-segregating particulate admixture at a weight ratio of supported bismuth oxide to chromia-alumina of about 1:1 for use in the conversion of noncyclic $C_3$–$C_5$ alkanes to aromatic hydrocarbons of twice the number of carbon atoms as the alkane converted wherein the weight ratio of chromia-alumina to bismuth oxide alone is about 8.4:1 to 4.6:1 said supported bismuth oxide particles and chromia-alumina particles being of substantially the same density and having a mesh size of from 20 to 50, said supported bismuth oxide particles being produced by dissolving bismuth nitrate in dilute nitric acid, contacting the resulting solution with silica gel particles in the 20 to 50 mesh range, U.S. Sieve, to deposit the bismuth nitrate on the silica gel surface, the ratio of bismuth nitrate to silica gel being adjusted such that after the bismuth nitrate is converted to the bismuth oxide, the bismuth oxide on the silica gel will range from about 12 weight per cent to 22 weight per cent based on the combined weight of the bismuth oxide and silica gel, drying the coated particles, contacting the coated particles with a dilute solution of ammonium hydroxide until the final pH of the wash solution is about 10, recovering the solids by filtration, drying the recovered solids at from about 100°C. to 150°C. calcining the dried solids by gradually increasing the calcination temperature over a period of about 6 to 8 hours to a final temperature in the range of 575°C. to 625°C. and finishing the calcination by holding the particles at the final calcination temperature for about 1 hour, said chromia alumina catalyst being prepared by contacting a chromia-alumina catalyst containing from 10 to 25 mole per cent chromia having a particle size in the range of from 20 to 50 mesh, U.S. Sieve, with a dilute aqueous solution of a base selected from the group consisting of sodium hydroxide, potassium hydroxide and ammonium hydroxide for a time sufficient to substantially completely neutralize the acidic sites on said catalyst, washing the neutralized catalyst with water until the wash water has a pH of about 7 and drying the washed catalyst prior to admixture.

* * * * *